(12) United States Patent
Collopy

(10) Patent No.: US 11,725,578 B2
(45) Date of Patent: *Aug. 15, 2023

(54) GAS TURBINE ENGINE HAVING ELECTRIC MOTOR FOR APPLYING POWER TO A SPOOL SHAFT AND METHOD FOR OPERATING SAME

(71) Applicant: Raytheon Technologies Corporation, Farmington, CT (US)

(72) Inventor: Gary Collopy, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,592

(22) Filed: Jan. 3, 2022

(65) Prior Publication Data

US 2022/0120215 A1    Apr. 21, 2022

Related U.S. Application Data

(63) Continuation of application No. 16/678,707, filed on Nov. 8, 2019, now Pat. No. 11,215,117.

(51) Int. Cl.

| | |
|---|---|
| *F02C 6/00* | (2006.01) |
| *F02C 6/14* | (2006.01) |
| *F02C 7/32* | (2006.01) |
| *F02C 7/36* | (2006.01) |
| *F02C 3/107* | (2006.01) |
| *F02C 3/06* | (2006.01) |
| *F02C 9/16* | (2006.01) |
| *B64D 27/02* | (2006.01) |

(52) U.S. Cl.
CPC ............... *F02C 3/107* (2013.01); *F02C 3/06* (2013.01); *F02C 6/00* (2013.01); *F02C 6/14* (2013.01); *F02C 7/32* (2013.01); *B64D 2027/026* (2013.01); *F02C 7/36* (2013.01); *F02C 9/16* (2013.01)

(58) Field of Classification Search
CPC .... F02C 3/107; F02C 3/06; F02C 6/00; F02C 6/14; F02C 7/32; F02C 7/36
See application file for complete search history.

(56) References Cited

U.S. PATENT DOCUMENTS

| | | | | |
|---|---|---|---|---|
| 5,172,543 | A | * | 12/1992 | White ................... F02C 7/275 60/778 |
| 5,694,765 | A | | 12/1997 | Hield |
| 6,438,962 | B1 | * | 8/2002 | Blain ................... F01D 25/36 60/788 |
| 7,513,120 | B2 | | 4/2009 | Kupratis |
| 8,601,786 | B2 | * | 12/2013 | Hurwitz ................ F01D 17/08 60/226.3 |
| 9,109,461 | B2 | * | 8/2015 | Takahashi ............. F01D 25/00 |

(Continued)

*Primary Examiner* — William H Rodriguez
(74) *Attorney, Agent, or Firm* — Getz Balich LLC

(57) ABSTRACT

A gas turbine engine includes a low-pressure spool, a high-pressure spool, and an electric motor. The low-pressure spool includes a low-pressure compressor in rotational communication with a low-pressure turbine and a fan via a first shaft. The high-pressure spool includes a high-pressure compressor in rotational communication with a high-pressure turbine via a second shaft. The electric motor is operably connected to the second shaft. The electric motor is configured to apply a rotational force to the second shaft.

17 Claims, 6 Drawing Sheets

(56) References Cited

U.S. PATENT DOCUMENTS

| | | | |
|---|---|---|---|
| 10,196,923 B2 | 2/2019 | Thomassin | |
| 10,309,304 B2 | 6/2019 | Bourne | |
| 10,336,461 B2 | 7/2019 | Mackin | |
| 10,450,886 B2 | 10/2019 | Sennoun | |
| 10,569,759 B2 | 2/2020 | Gansler | |
| 10,696,416 B2 | 6/2020 | Gansler | |
| 10,738,706 B2 | 8/2020 | Gansler | |
| 10,774,741 B2 | 9/2020 | Sennoun | |
| 10,914,234 B1 | 2/2021 | Steven | |
| 10,934,972 B2 | 3/2021 | Hrach | |
| 2005/0056021 A1 | 3/2005 | Belokon | |
| 2006/0242941 A1 | 11/2006 | Johnson | |
| 2006/0242942 A1 | 11/2006 | Johnson | |
| 2006/0242943 A1 | 11/2006 | Johnson | |
| 2006/0242962 A1 | 11/2006 | Johnson | |
| 2006/0272313 A1 | 12/2006 | Eick | |
| 2006/0283206 A1* | 12/2006 | Rasmussen | F04D 25/04 62/619 |
| 2008/0056910 A1 | 3/2008 | Wolflick | |
| 2010/0164234 A1 | 7/2010 | Bowman | |
| 2012/0000204 A1* | 1/2012 | Kesseli | F02C 3/107 60/778 |
| 2012/0076641 A1* | 3/2012 | Jarrett, Jr. | F04D 29/563 415/160 |
| 2012/0221157 A1 | 8/2012 | Finney | |
| 2013/0008173 A1* | 1/2013 | Fletcher | F01K 3/22 60/39.182 |
| 2013/0076035 A1 | 3/2013 | Koenig | |
| 2013/0076120 A1 | 3/2013 | Wagner | |
| 2013/0098055 A1* | 4/2013 | Kupratis | F02C 7/143 60/774 |
| 2015/0260050 A1* | 9/2015 | Taima | F01D 11/006 416/221 |
| 2015/0260231 A1* | 9/2015 | Fukutani | F01D 5/066 403/299 |
| 2015/0275760 A1* | 10/2015 | Kimura | F02C 7/06 60/39.08 |
| 2016/0208709 A1* | 7/2016 | Huang | F02C 7/26 |
| 2017/0152757 A1 | 6/2017 | Giordan | |
| 2017/0187311 A1 | 6/2017 | French | |
| 2017/0191381 A1* | 7/2017 | Baba | F01D 25/28 |
| 2017/0226934 A1 | 8/2017 | Robic | |
| 2017/0363043 A1 | 12/2017 | Razak | |
| 2018/0002025 A1* | 1/2018 | Lents | F02K 3/06 |
| 2018/0003109 A1 | 1/2018 | Lents | |
| 2018/0149115 A1 | 5/2018 | Razak | |
| 2018/0178920 A1 | 6/2018 | Swann | |
| 2018/0245628 A1* | 8/2018 | Takaoka | F16C 35/063 |
| 2018/0245629 A1* | 8/2018 | Takaoka | F16C 27/066 |
| 2018/0245630 A1* | 8/2018 | Takaoka | F16C 27/045 |
| 2018/0245631 A1* | 8/2018 | Nakayama | F16C 33/581 |
| 2018/0245632 A1* | 8/2018 | Obara | F16C 33/667 |
| 2018/0354631 A1 | 12/2018 | Adibhatla | |
| 2019/0234217 A1* | 8/2019 | Narita | F01D 5/141 |
| 2019/0234239 A1* | 8/2019 | Tsujimoto | F01D 25/164 |
| 2019/0234458 A1* | 8/2019 | Taguchi | F16C 19/06 |
| 2019/0234459 A1* | 8/2019 | Taguchi | F16C 19/06 |
| 2019/0292993 A1 | 9/2019 | Pal | |
| 2019/0322379 A1 | 10/2019 | Mackin | |
| 2019/0323426 A1 | 10/2019 | Mackin | |
| 2019/0323427 A1 | 10/2019 | Mackin | |
| 2019/0368500 A1 | 12/2019 | Epstein | |
| 2020/0025149 A1 | 1/2020 | Hrach | |
| 2020/0040747 A1* | 2/2020 | Tsukioka | F01D 9/042 |
| 2020/0055610 A1 | 2/2020 | Terwilliger | |
| 2020/0056546 A1 | 2/2020 | Terwilliger | |
| 2020/0102885 A1 | 4/2020 | Kupratis | |
| 2020/0173369 A1 | 6/2020 | Husband | |
| 2020/0240331 A1 | 7/2020 | Kupratis | |
| 2020/0248619 A1 | 8/2020 | Romero | |
| 2020/0248632 A1 | 8/2020 | Leque | |
| 2020/0284159 A1* | 9/2020 | Taguchi | F01D 21/04 |
| 2020/0284432 A1* | 9/2020 | Kamoi | F23R 3/42 |
| 2020/0284433 A1* | 9/2020 | Kamoi | F23R 3/60 |
| 2021/0017914 A1 | 1/2021 | Turner | |
| 2021/0033492 A1 | 2/2021 | Verniau | |
| 2021/0039802 A1 | 2/2021 | Chesneau | |
| 2021/0050810 A1 | 2/2021 | Collopy | |
| 2021/0075298 A1 | 3/2021 | Syska | |
| 2021/0115857 A1 | 4/2021 | Collopy | |
| 2021/0189970 A1 | 6/2021 | Morreale | |

\* cited by examiner

# GAS TURBINE ENGINE HAVING ELECTRIC MOTOR FOR APPLYING POWER TO A SPOOL SHAFT AND METHOD FOR OPERATING SAME This application is a continuation of U.S. patent application Ser. No. 16/678,707 filed Nov. 8, 2019, which is hereby incorporated herein by reference in its entirety.

BACKGROUND

1. Technical Field

This disclosure relates generally to gas turbine engines, and more particularly to systems and methods for operating a low-pressure compressor of a gas turbine engine.

2. Background Information

Two spool turbofan and turboprop jet engines may typically include at least three sections in the core. The first section is a compressor section, which includes a low-pressure compressor followed by a high-pressure compressor. A combustor section is disposed between the compressor section and a turbine section, which includes a high-pressure turbine followed by a low-pressure turbine. The low-pressure turbine is connected to and drives the low-pressure compressor by a first shaft and the high-pressure turbine is connected to the high-pressure compressor by a second shaft.

The compressor and turbine sections of a turbofan or turboprop engine typically include a series of stator vane and rotor blade stages. The stator vanes of each stage are positioned in front of a rotor to efficiently direct air flow to the blades of the rotor. In general, the stator vanes redirect the trajectory of the air coming off the rotors of the preceding stage for flow into the next stage.

Variable stator vane assemblies have been used in conventional gas turbine engines to improve the performance and operability of the engine. In particular, such variable vane assemblies have been used in gas turbine engines incorporating fan drive gear systems to allow the first shaft of the gas turbine engine to operate at a faster speed than a fan of the gas turbine engine. Variable vane assemblies typically include variable vanes which extend forward of rotor blades. The variable vanes may be rotatable about substantially radial axes. The orientation of the variable vanes varies the attack angle of the vanes in a controlled fashion. This allows the variable vanes to be realigned to change the impingement angle of compressed air onto the following rotor blades as the operating condition of the engine changes. The position of the variable vanes may be changed by many different means, including, but not limited to a linkage attached to an actuator ring on the outside of the compressor case or a gear driven arrangement. Thus, air flow through the gas turbine engine can be controlled, in part, by using variable vanes and such variable vanes have been used to control the incidence of air flow onto rotor blades of subsequent compressor stages under different operating conditions.

However, the inclusion of variable vanes in the low-pressure compressor, as well as the associated linkages and actuators, necessarily adds additional weight to the gas turbine engine as well as increasing cost and complexity of manufacturing the gas turbine engine. Accordingly, a need exists for a system and/or a method of operating a gas turbine engine, which addresses one or more of the above-noted concerns.

SUMMARY

It should be understood that any of all of the features or embodiments described herein can be used or combined in any combination with each and every other feature or embodiment described herein unless expressly noted otherwise.

According to an embodiment of the present disclosure, a gas turbine engine includes a low-pressure spool, a high-pressure spool, and an electric motor. The low-pressure spool includes a low-pressure compressor in rotational communication with a low-pressure turbine and a fan via a first shaft. The high-pressure spool includes a high-pressure compressor in rotational communication with a high-pressure turbine via a second shaft. The electric motor is operably connected to the second shaft. The electric motor is configured to apply a rotational force to the second shaft.

In the alternative or additionally thereto, in the foregoing embodiment, the low-pressure compressor is a fixed-vane compressor.

In the alternative or additionally thereto, in the foregoing embodiment, the gas turbine engine further includes an engine accessory gearbox operably connecting the electric motor to the second shaft.

In the alternative or additionally thereto, in the foregoing embodiment, the gas turbine engine further includes an energy storage device in electrical communication with the electric motor.

In the alternative or additionally thereto, in the foregoing embodiment, the energy storage device is a battery.

In the alternative or additionally thereto, in the foregoing embodiment, the gas turbine engine further includes a controller configured to selectively apply electrical energy from the energy storage device to the electric motor causing the electric motor to apply the rotational force to the second shaft.

In the alternative or additionally thereto, in the foregoing embodiment, the low-pressure spool further includes an electrical generator operably connected to the first shaft. The electrical generator is in electrical communication with the electric motor.

In the alternative or additionally thereto, in the foregoing embodiment, the gas turbine engine further includes a controller configured to selectively apply electrical energy from the electrical generator to the electric motor causing the electric motor to apply the rotational force to the second shaft.

In the alternative or additionally thereto, in the foregoing embodiment, the low-pressure spool further includes a fan drive gear system connecting the fan to the first shaft to drive the fan at a lower speed than the low-pressure spool.

According to another embodiment of the present disclosure, a method for operating a gas turbine engine includes providing a low-pressure spool including a low-pressure compressor in rotational communication with a low-pressure turbine and a fan via a first shaft; providing a high-pressure spool including a high-pressure compressor in rotational communication with a high-pressure turbine via a second shaft; and applying a rotational force to the second shaft with an electric motor operably connected to the second shaft.

In the alternative or additionally thereto, in the foregoing embodiment, the low-pressure compressor is a fixed-vane compressor.

In the alternative or additionally thereto, in the foregoing embodiment, the method further includes calculating, with a controller, a current operating state of the low-pressure compressor.

In the alternative or additionally thereto, in the foregoing embodiment, the method further includes determining, with the controller, a maximum operating line of the low-pressure compressor.

In the alternative or additionally thereto, in the foregoing embodiment, the method further includes selectively applying the rotational force to the second shaft, with the electric motor, to maintain the current operating state of the low-pressure compressor less than or equal to the maximum operating line of the low-pressure compressor.

In the alternative or additionally thereto, in the foregoing embodiment, the method further includes controlling, with the controller, a speed of the electric motor to maintain the current operating state of the low-pressure compressor less than or equal to the maximum operating line of the low-pressure compressor.

In the alternative or additionally thereto, in the foregoing embodiment, the method further includes generating electrical energy with an electrical generator operably connected to the first shaft; and applying the electrical energy to the electric motor.

In the alternative or additionally thereto, in the foregoing embodiment, the method further includes applying electrical energy to the electric motor with an energy storage device.

In the alternative or additionally thereto, in the foregoing embodiment, the energy storage device is a battery.

In the alternative or additionally thereto, in the foregoing embodiment, determining, with the controller, the current operating state of the low-pressure compressor includes determining, with the controller, a pressure ratio of the low-pressure compressor and an air flow of the low-pressure compressor using one or more sensors in communication with the controller.

According to another embodiment of the present disclosure, a gas turbine engine includes a low-pressure spool, a high-pressure spool, an electric motor, an energy storage device, and a controller. The low-pressure spool includes a fixed-vane low-pressure compressor in rotational communication with a low-pressure turbine and a fan via a first shaft. The low-pressure spool further includes a fan drive gear system connecting the fan to the first shaft to drive the fan at a lower speed than the low-pressure spool. The high-pressure spool includes a high-pressure compressor in rotational communication with a high-pressure turbine via a second shaft. The electric motor is operably connected to the second shaft. The electric motor is configured to apply a rotational force to the second shaft. The energy storage device is in electrical communication with the electric motor. The controller is configured to selectively apply electrical energy from the energy storage device to the electric motor causing the electric motor to apply the rotational force to the second shaft.

The present disclosure, and all its aspects, embodiments and advantages associated therewith will become more readily apparent in view of the detailed description provided below, including the accompanying drawings.

DETAILED DESCRIPTION

Figure 1:
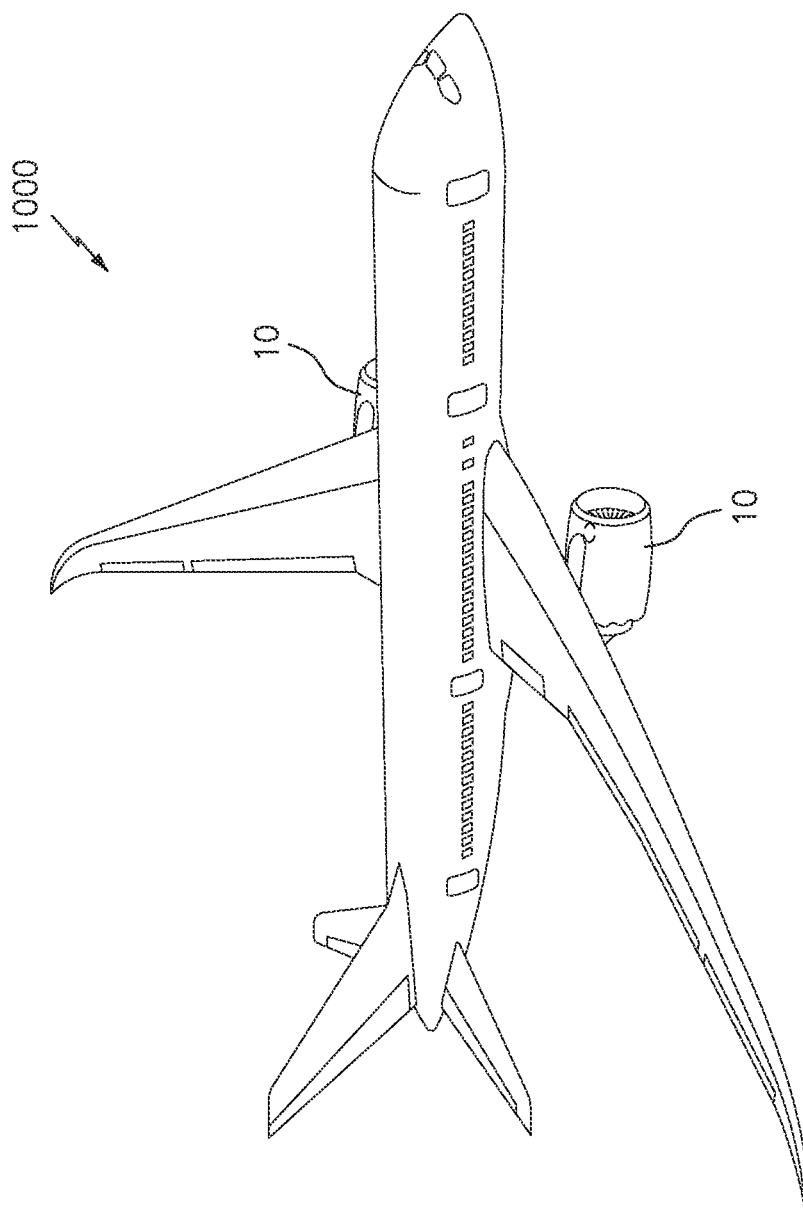
FIG. 1 illustrates a perspective view of an aircraft in accordance with one or more embodiments of the present disclosure.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 2:
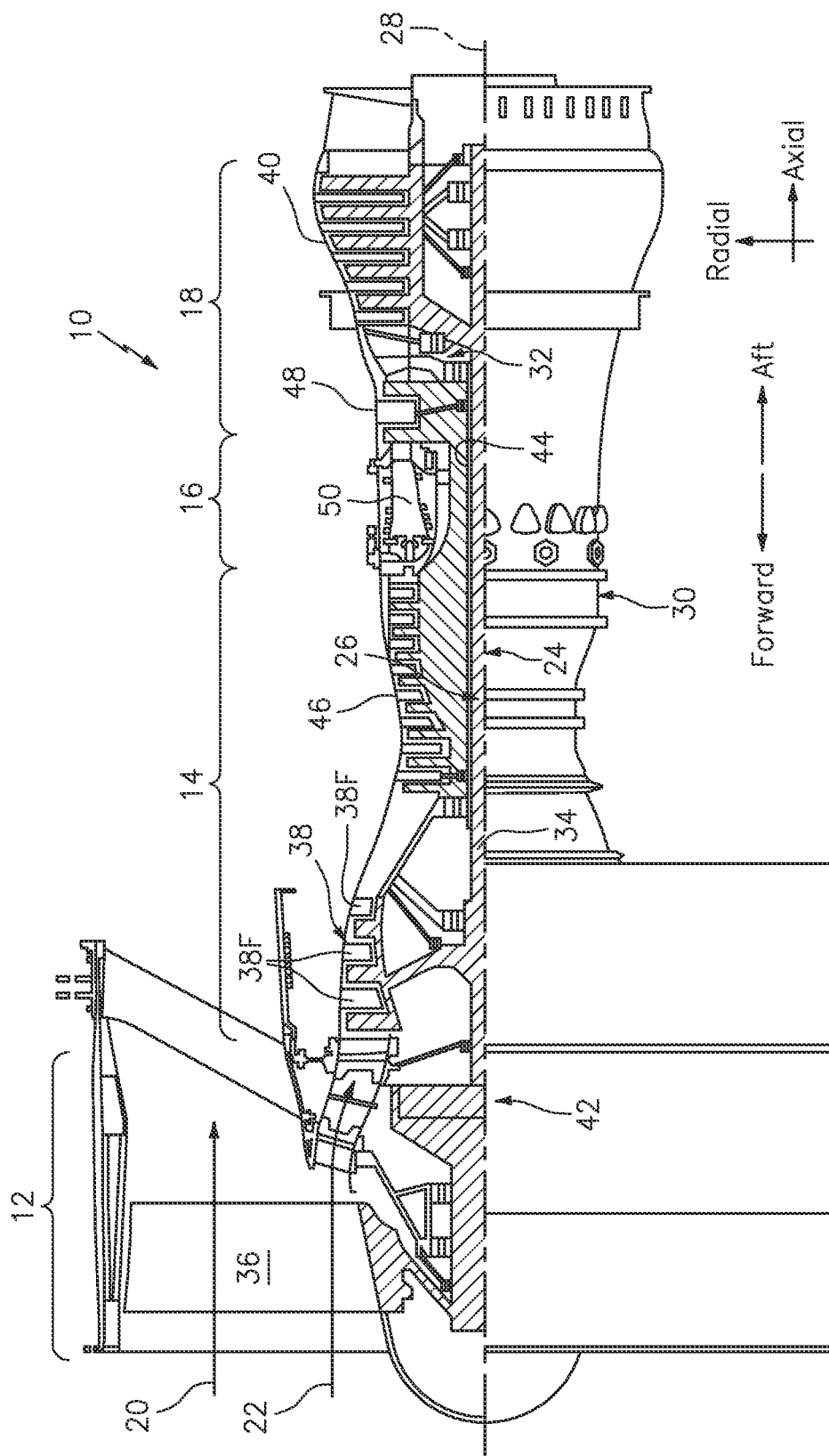
FIG. 2 illustrates a side cross-sectional view of a gas turbine engine in accordance with one or more embodiments of the present disclosure.

Referring to FIGS. 1 and 2, an aircraft 1000 including at least one gas turbine engine 10 is illustrated. The gas turbine engine 10 is disclosed herein as a two-spool turbofan engine that generally includes a fan section 12, a compressor section 14, a combustor section 16, and a turbine section 18. The fan section 12 drives air along a bypass flowpath 20 while the compressor section 14 drives air along a core flowpath 22 for compression and communication into the combustor section 16 and then expansion through the turbine section 18. Although depicted as a turbofan gas turbine engine in the disclosed non-limiting embodiments, it should be understood that the concepts described herein are not limited to use with turbofans as the teachings may be applied to other types of turbine engines including those having various spool architectures such as one- or three-spool architectures. Furthermore, aspects of the present disclosure may be applicable to conventional and hybrid gas turbine engines.

The gas turbine engine 10 generally includes a low-pressure spool 24 and a high-pressure spool 26 mounted for rotation about a longitudinal centerline 28 of the gas turbine engine 10 relative to an engine static structure 30 via one or more bearing systems 32. It should be understood that various bearing systems 32 at various locations may alternatively or additionally be provided.

The low-pressure spool 24 generally includes a first shaft 34 that interconnects a fan 36, a low-pressure compressor 38, and a low-pressure turbine 40. The first shaft 34 is connected to the fan 36 through a gear assembly of a fan drive gear system 42 to drive the fan 36 at a lower speed than the low-pressure spool 24. In various embodiments, the low-pressure compressor 38 may include a combination of fixed and variable vanes in one or more stages of the low-pressure compressor 38. In various other embodiments, the low-pressure compressor 38 is a fixed-vane compressor. In other words, all of the vanes of the low-pressure compressor 38 are fixed vanes 38F (i.e., the low-pressure compressor 38 does not include variable vanes).

The high-pressure spool 26 generally includes a second shaft 44 that interconnects a high-pressure compressor 46 and a high-pressure turbine 48. A combustor 50 is disposed between the high-pressure compressor 46 and the high-pressure turbine 48 along the longitudinal centerline 28. The first shaft 34 and the second shaft 44 are concentric and rotate via the one or more bearing systems 32 about the longitudinal centerline 28 which is collinear with respective longitudinal centerlines of the first and second shafts 34, 44. It should be understood that "low pressure" and "high pressure" or variations thereof as used herein are relative terms indicating that the high pressure is greater than the low pressure.

Airflow along the core flowpath 22 is compressed by the low-pressure compressor 38, then the high-pressure compressor 46, mixed and burned with fuel in the combustor 50, and then expanded over the high-pressure turbine 48 and the low-pressure turbine 40. The low-pressure turbine 40 and the high-pressure turbine 48 rotationally drive the low-pressure spool 24 and the high-pressure spool 26, respectively in response to the expansion.

Figure 3:
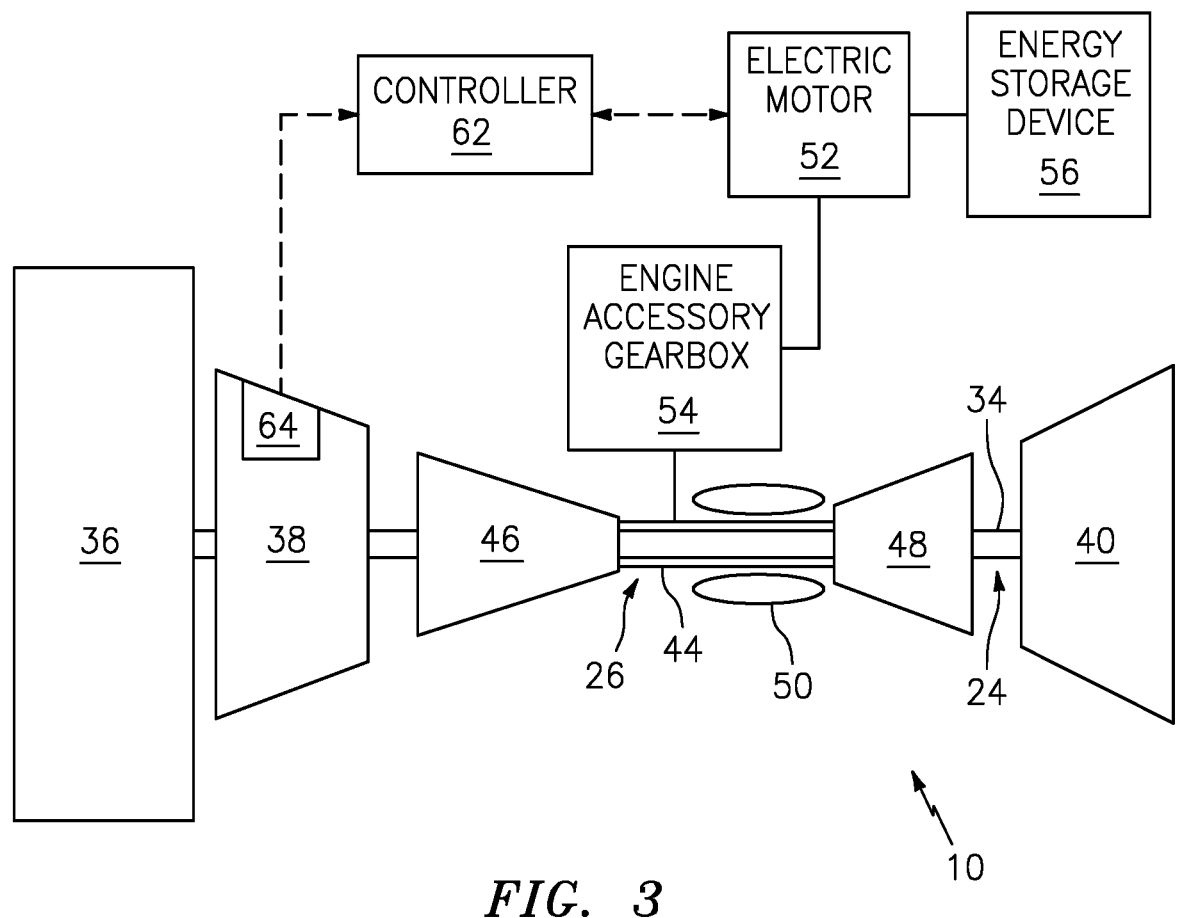
FIG. 3 schematically illustrates an exemplary gas turbine engine in accordance with one or more embodiments of the present disclosure.
Figure 4:
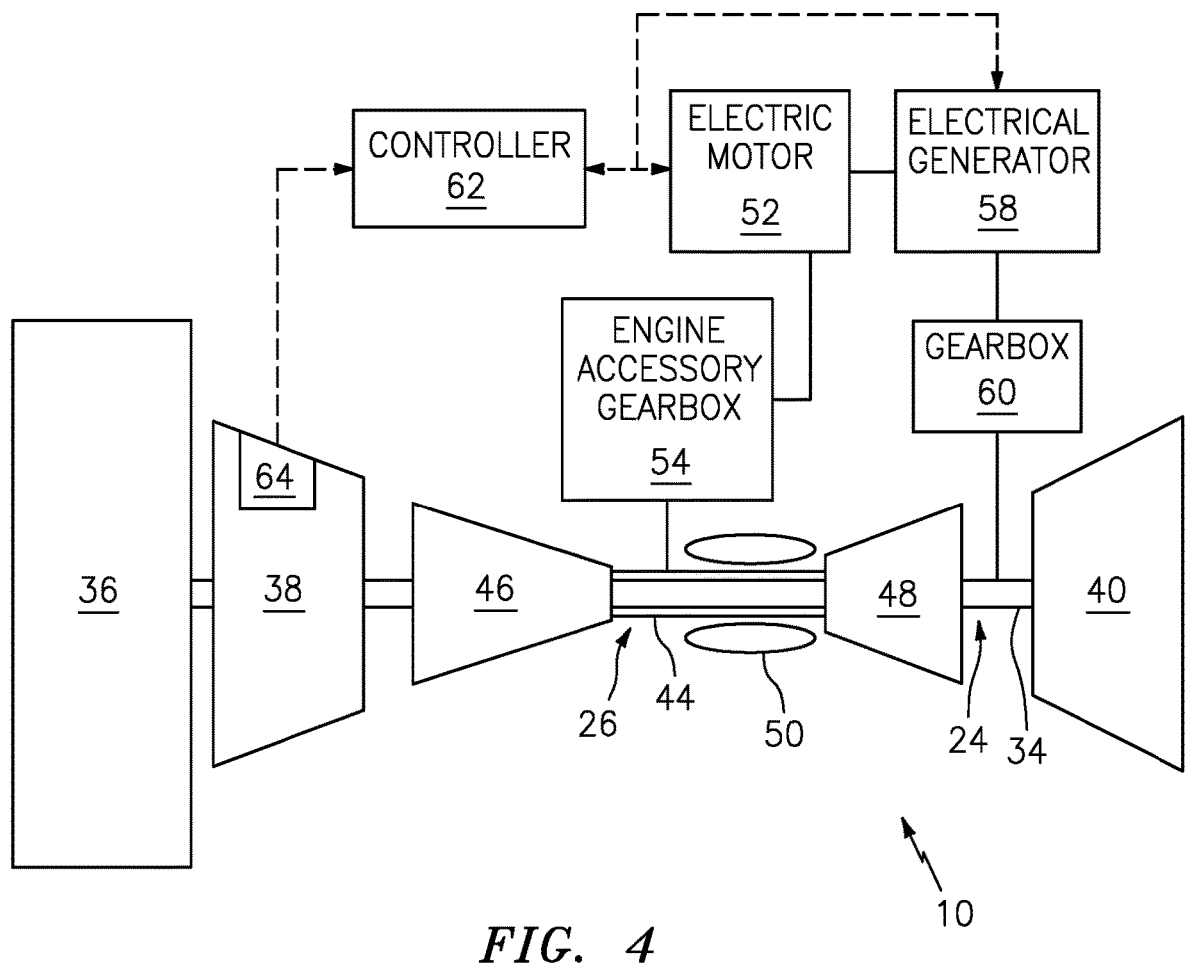
FIG. 4 schematically illustrates an exemplary gas turbine engine in accordance with one or more embodiments of the present disclosure.

Referring to FIGS. 3 and 4, the gas turbine engine 10 includes an electric motor 52 operably connected to the second shaft 44 of the high-pressure spool 26. The electric motor 52 may be operably connected to the second shaft 44 by an engine accessory gearbox 54 such that the electric motor 52 is configured to apply a rotational force to the second shaft 44. One or more additional shafts and/or gearboxes may be used to operably connect the electric motor 52 to the second shaft 44. The electric motor 52 may be configured to selectively apply a variable rotational force to the second shaft 44 so as to assist the high-pressure turbine 48 in rotation of the second shaft 44.

As shown in FIG. 3, in various embodiments, the aircraft 1000 includes an energy storage device 56 in electrical communication with the electric motor 52. The energy storage device 56 may provide electrical energy to the electric motor 52 for operation of the electric motor 52 to apply the rotational force to the second shaft 44. The energy storage device 56 may be any suitable energy storage device suitable for storage of electrical energy such as, but not limited to, one or more of a battery, a capacitor, etc. The energy storage device 56 may be disposed internally or externally with respect to the gas turbine engine 10 (e.g., the energy storage device 56 may be disposed in the aircraft 1000 outside of the gas turbine engine 10). The energy storage device 56 may additionally be in electrical communication with an electrical distribution system of the aircraft 1000 and/or one or more electrical loads of the aircraft 1000 such as, but not limited to electronics, climate control systems, electric motors, lighting systems, gas turbine engine 10 support systems, weapon and/or detection systems (e.g., radar), etc.

As shown in FIG. 4, in various embodiments the gas turbine engine 10 includes an electrical generator 58 in electrical communication with the electric motor 52. Additionally or alternatively to the energy storage device 56 discussed above, the electrical generator 58 may provide electrical energy to the electric motor 52 for operation of the electric motor 52 to apply the rotational force to the second shaft 44. In various embodiments, the electrical generator 58 may be operably connected to the first shaft 34 of the low-pressure spool 24, for example, by one or more gear boxes 60. The electrical generator 58 may be selectively operated to generate electrical energy for the electric motor 52. In various embodiments, the electrical generator 58 may additionally be in electrical communication with the energy storage device 56 discussed above such that energy storage device 56 may store the electrical energy output of the electrical generator 58. In such an embodiment, one or both of the energy storage device 56 and the electrical generator 58 may be configured to selectively apply electrical energy for operation of the electric motor 52. The electrical generator 58 may additionally be in electrical communication with the electrical distribution system of the aircraft and/or one or more electrical loads of the aircraft 1000 discussed above.

In various embodiments, the gas turbine engine 10 may include a controller 62 configured to selectively apply electrical energy from one or both of the energy storage device 56 and the electrical generator 58 to the electric motor 52 to cause the electric motor 52 to apply the rotational force to the second shaft 44. The controller 62 may determine, based on a given flight condition, whether application of the rotational force by the electric motor 52 to the second shaft 44 is necessary. The controller 62 may further determine how much rotational force should be applied to the second shaft 44 by the electrical motor 52 and variably control the operation of the electric motor 52 accordingly. For example, the controller 62 may variably control a rotational speed of the electric motor 52 based on the given flight condition. The controller 62 may be in communication with one or more sensors 64 (e.g., pressure sensors) disposed within the gas turbine engine 10 (e.g., within the low-pressure compressor 38), for example, to determine when and how much rotational force to apply to the second shaft 44 with the electric motor 52. The controller 62 may use the signal output of the one or more sensors 64 to determine, for example, a pressure ratio of the low-pressure compressor 38 (e.g., a ratio of the discharge and suction pressure of one or more stages of the low-pressure compressor 38) or an air flow of the low-pressure compressor 38 (e.g., a mass flow rate of the air flow through one or more stages of the low-pressure compressor 38).

The controller 62 may include any type of computing device, computational circuit, or any type of process or processing circuit capable of executing a series of instructions that are stored in memory. The controller 62 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling, for example, the electric motor 52 and/or the electrical generator 58, and the stored instructions are not limited to any particular form (e.g., program files, system data, buffers, drivers, utilities, system programs, etc.) provided they can be executed by the controller 62. The memory may be a non-transitory computer readable storage medium configured to store instructions that when executed by one or more processors, cause the one or more processors to perform or cause the performance of certain functions. The memory may be a single memory device or a plurality of memory devices. A memory device may include a storage area network, network attached storage, as well a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the controller 62 may be achieved via the use of hardware, software, firmware, or any combination thereof. The controller 62 may also include input (e.g., a keyboard, a touch screen, etc.) and output devices (a monitor, sensor readouts, data ports, etc.) that enable the operator to input instructions, receive data, etc.

Figure 5:
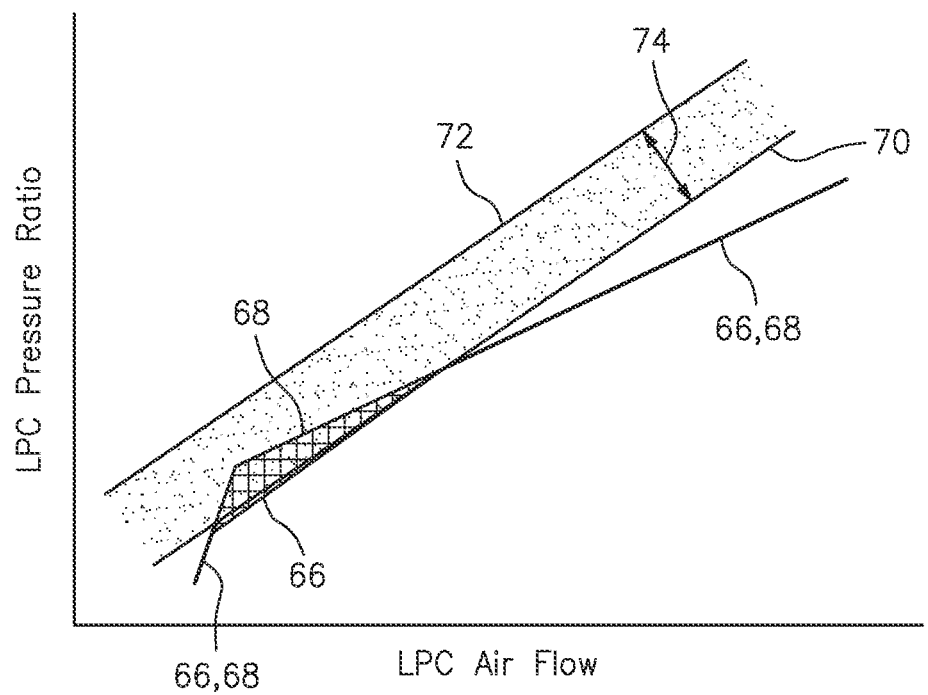
FIG. 5 illustrates a graph indicating operating lines associated with an exemplary gas turbine engine in accordance with one or more embodiments of the present disclosure.
Figure 6:
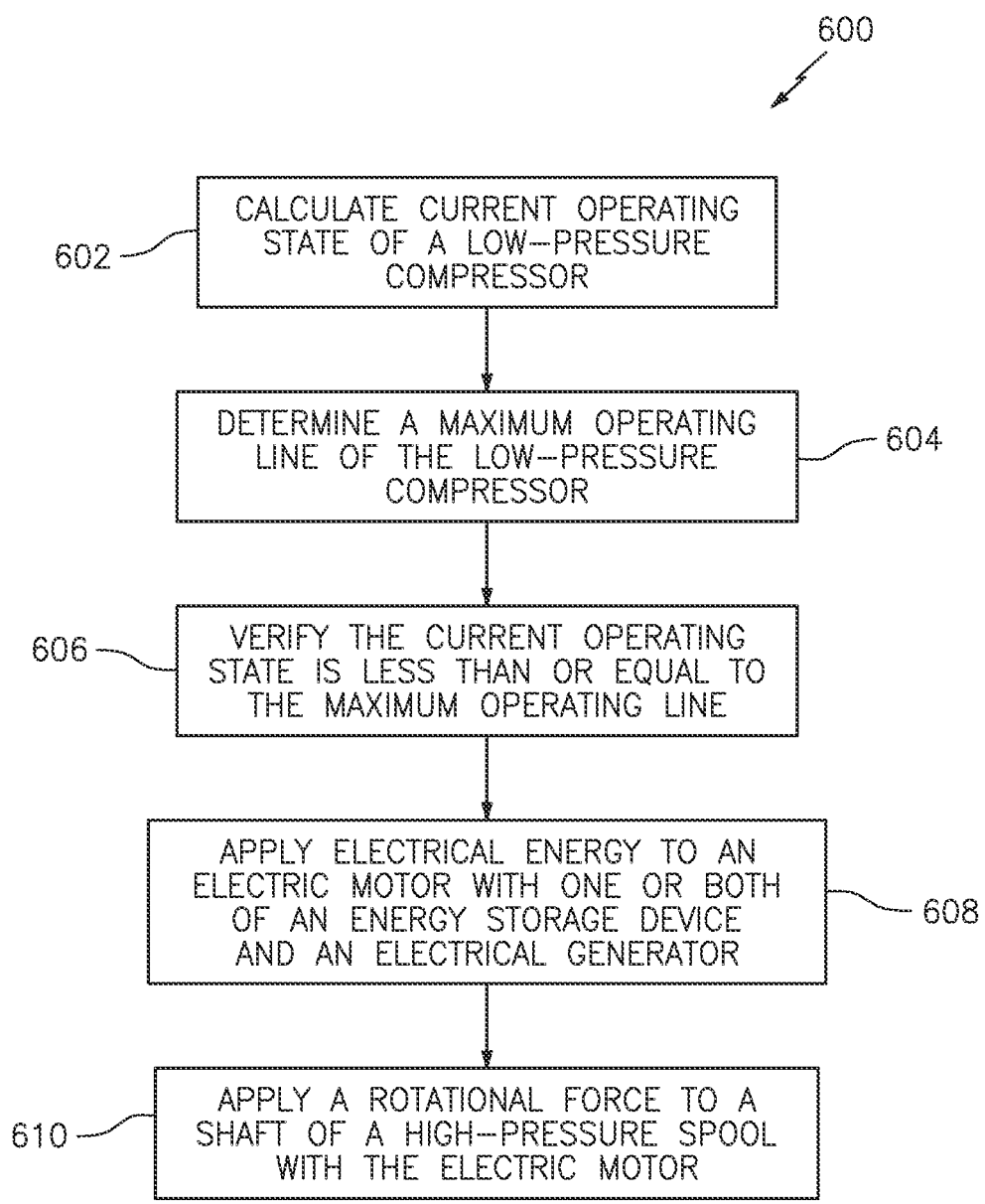
FIG. 6 illustrates a flowchart depicting a method for operating a gas turbine engine in accordance with one or more embodiments of the present disclosure.

Referring to FIGS. 3-5, the controller 62 may cause the electric motor 52 to apply the rotational force to the second shaft 44 based on a current operating state of the low-pressure compressor 38. FIG. 5 illustrates an exemplary graph (e.g., a "compressor map") of an operating state 66, 68 of the low-pressure compressor 38 with respect to a maximum operating line 70 of the low-pressure compressor 38. The maximum operating line 70 for the low-pressure compressor is determined from a low-pressure compressor stall line 72 associated with the low-pressure compressor 38 adjusted to include an adequate stall margin 74 for safe operation of the low-pressure compressor 38. Operating state 68 indicates an uncorrected operating state which exceeds the maximum operating line 70 for the low-pressure compressor 38 along a portion of the operating range of the low-pressure compressor 38.

Some gas turbine engines have used variable vanes within the low-pressure compressor 38 to ensure that the operating state (e.g., a corrected operating state 66) remains below the maximum operating line 70 of the low-pressure compressor 38. However, as noted above, inclusion of variable vanes within the low-pressure compressor 38 may add substantial weight to gas turbine engines as well as additional cost and complexity for their manufacture. According to one or more embodiments of the present disclosure, corrected operating state 66 of the low-pressure compressor 38 may be maintained below the maximum operating line 70 of the low-pressure compressor 38 by selectively applying the rotational force to the second shaft 44 with the electric motor 52. As a result, a gas turbine engine 10 according to one or more embodiments of the present disclosure may provide for a reduction in the number of variable vanes within the low-pressure compressor 38 or for a low-pressure compressor 38 which does not include any variable vanes (i.e., a fixed-vane compressor).

In various embodiments, the controller 62 may store one or more of the low-pressure compressor stall line 74, the stall margin, 72, and/or the maximum operating line 70 as predetermined values in memory. In various other embodiments, the controller 62 may, additionally or alternatively, continuously determine one or more of the low-pressure compressor stall line 74, the stall margin, 72, and/or the maximum operating line 70 values based on operational conditions of the gas turbine engine 10.

Referring to FIGS. 3-6, a method 600 for operating a gas turbine engine (e.g., gas turbine engine 10) is provided. In Step 602, the controller 62 calculates a current operating state 66 of the low-pressure compressor 38. As discussed above, the current operating state 66 may be calculated using information provided by the one or more sensors 64 to determine, for example, the pressure ratio of the low-pressure compressor 38 and/or the air flow of the low-pressure compressor 38.

In Step 604, the controller 62 determines a maximum operating line 70 of the low-pressure compressor 38. The maximum operating line 70 may be a predetermined operating line stored in memory of the controller 62 or the maximum operating line 70 may be calculated by the controller 62, based on operating conditions of the gas turbine engine 10, to provide a sufficient stall margin 74 with respect to the low-pressure compressor stall line 72.

In Step 606, the controller 62 verifies that the current operating state 66 of the low-pressure compressor 38 is less than or equal to the maximum operating line 70 for the low-pressure compressor 38. In the event that the current operating state 66 is at or below the maximum operating line 70, the controller 62 may cause the electric motor 52 to remain in a secured condition. Alternatively, in the event that the current operating state 66 exceeds or is anticipated to exceed the maximum operating line 70, in Step 608, the controller may cause one or both of the energy storage device 56 and the electrical generator 58 to apply electrical energy to the electric motor 52. Step 608 may alternatively or additionally include generating electrical energy with the electrical generator 58 operably connected to the first shaft 34 and applying the generated electrical energy to the electric motor 52. Step 608 may alternatively or additionally include generating electrical energy with the electrical generator 58 for storage in the energy storage device 56, which electrical energy may subsequently be applied to the electric motor 52 by the energy storage device 56.

Accordingly, in Step 610, the controller 62 may cause the electric motor 52 to operate to selectively apply the rotational force to the second shaft 44 to maintain the current operating state 66 less than or equal to the maximum operating line 70. For example, the electric motor 52 may apply the rotational force to the second shaft 44 so as to reduce the current operating state 66 of the low-pressure compressor 38, relative to the maximum operating line 70, by an amount substantially equal to the reduction of the operating state provided by low-pressure compressor variable vanes in conventional gas turbine engines.

In various embodiments, the verification of Step 606 may be performed continuously by the controller 62. As a result, the controller 62 may continuously determine whether a need exists to energize or secure the electric motor 52 or control the rotational force of the electric motor 52 applied to the second shaft 44 so as to maintain the current operating state 66 of the low-pressure compressor 38 below the maximum operating line 70. For example, the controller 62 may variably control the speed of the electric motor 52 to maintain the current operating state 66 of the low-pressure compressor 38 less than or equal to the maximum operating line 70 of the low-pressure compressor 38. In various embodiments, the controller 62 may cause the electric motor 52 to apply the rotational force to the second shaft 44 with the current operating state 66 below or significantly below the maximum operating line 70, for example, to improve performance of the gas turbine engine 10 (e.g., to improve fuel efficiency).

By applying the rotational force to the second shaft 44 with the electric motor 52 during certain operating conditions of the gas turbine engine 10, variable vanes within the low-pressure compressor 38 may be reduced or eliminated. Accordingly, the vane actuators and linkages associated with said variable vanes may also be eliminated, thereby reducing the weight of the gas turbine engine 10 as well as reducing the cost and complexity of manufacturing the gas turbine engine 10, while still meeting the same low-pressure compressor 38 stability requirements as a gas turbine engine with variable vanes on the associated low-pressure compressor. Further, a fixed-vane compressor, such as the low-pressure compressor 38 in various embodiments, may have better performance than a variable-vane compressor as a result of the outer chord gap closure associated with the fixed vanes reducing leakage compared to variable-vane compressors.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A gas turbine engine comprising:
a first spool including a first compressor driven by a first shaft;
a second spool including a second compressor driven by a second shaft, the second compressor positioned downstream of the first compressor with respect to a core flowpath of the gas turbine engine;
an electric motor operably connected to the second shaft, the electric motor configured to apply a rotational force to the second shaft; and
a controller including a processor in communication with a non-transitory memory storing instructions, which instructions when executed by the processor, cause the processor to:
selectively apply a rotational force to the second shaft with the electric motor to maintain an operating state of the first compressor below a maximum operating line of the first compressor;
wherein the first compressor is a fixed-vane compressor.

2. The gas turbine engine of claim 1, further comprising an engine accessory gearbox operably connecting the electric motor to the second shaft.

3. The gas turbine engine of claim 1, further comprising an energy storage device in electrical communication with the electric motor.

4. The gas turbine engine of claim 3, wherein the energy storage device is a battery.

5. The gas turbine engine of claim 3, wherein the instructions, when executed by the processor, further cause the processor to selectively apply electrical energy from the energy storage device to the electric motor causing the electric motor to apply the rotational force to the second shaft.

6. The gas turbine engine of claim 1, wherein the first spool includes an electrical generator operably connected to the first shaft, the electrical generator in electrical communication with the electric motor.

7. The gas turbine engine of claim 6, wherein the instructions, when executed by the processor, further cause the processor to selectively apply electrical energy from the electrical generator to the electric motor causing the electric motor to apply the rotational force to the second shaft.

8. The gas turbine engine of claim 7, further comprising at least one sensor configured to measure a pressure within the first compressor, the at least one sensor in signal communication with the controller.

9. The gas turbine engine of claim 8, wherein the instructions, when executed by the processor, further cause the processor to determine a pressure ratio of the first compressor based, at least in part, on the measured pressure from the at least one sensor.

10. A method for operating a gas turbine engine, the method comprising:
providing a first spool including a first compressor driven by a first shaft;
providing a second spool including a second compressor driven by a second shaft, the second compressor positioned downstream of the first compressor with respect to a core flowpath of the gas turbine engine;
calculating, with a controller, a current operating state of the first compressor;
determining, with the controller, a maximum operating line of the first compressor for the current operating state; and
selectively applying a rotational force to the second shaft with an electric motor operably connected to the second shaft to maintain the current operating state of the first compressor less than or equal to the maximum operating line of the first compressor;
wherein the first compressor is a fixed-vane compressor.

11. The method of claim 10, wherein the step of applying the rotational force to the second shaft includes anticipating the current operating state of the first compressor will exceed the determined maximum operating line of the first compressor for the current operating state.

12. The method of claim 10, further comprising controlling, with the controller, a speed of the electric motor to maintain the current operating state of the first compressor less than or equal to the determined maximum operating line of the first compressor for the current operating state.

13. The method of claim 12, wherein determining, with the controller, the current operating state of the first compressor includes determining a pressure ratio of the first compressor and an air flow of the first compressor using one or more sensors in communication with the controller.

14. The method of claim 10, further comprising generating electrical energy with an electrical generator operably connected to the first shaft, wherein the step of applying the rotational force to the second shaft with the electric motor includes applying the electrical energy to the electric motor.

15. The method of claim 10, wherein the step of applying the rotational force to the second shaft with the electric motor includes applying electrical energy to the electric motor with an energy storage device.

16. The method of claim 15, wherein the energy storage device is a battery.

17. The method of claim 15, further comprising generating electrical energy with an electrical generator operably connected to the first shaft, wherein the step of applying the rotational force to the second shaft with the electric motor includes applying the electrical energy to the electric motor from the electrical generator and the energy storage device.

\* \* \* \* \*